US012587102B2

(12) United States Patent　　(10) Patent No.:　US 12,587,102 B2
Kessler et al.　　　　　　　　　　(45) Date of Patent:　　　Mar. 24, 2026

(54) POWER SUPPLY SYSTEM WITH OPTIMIZED AVAILABILITY

(71) Applicant: Phoenix Contact GmbH & Co. KG, Blomberg (DE)

(72) Inventors: Nicola Kessler, Bielefeld (DE); Hartmut Henkel, Blomberg (DE); Jochen Zeuch, Blomberg (DE); Matthias Stiewe, Altenbeken (DE); Patrick Schweer, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 253 days.

(21) Appl. No.: 18/262,579

(22) PCT Filed: Jan. 14, 2022

(86) PCT No.: PCT/EP2022/050811
§ 371 (c)(1),
(2) Date: Jul. 24, 2023

(87) PCT Pub. No.: WO2022/161794
PCT Pub. Date: Aug. 4, 2022

(65) Prior Publication Data
US 2024/0079962 A1　　Mar. 7, 2024

(30) Foreign Application Priority Data
Jan. 26, 2021　　(LU) ........................................ 102478

(51) Int. Cl.
*H02M 3/335*　　　(2006.01)
*G05B 23/02*　　　(2006.01)

(52) U.S. Cl.
CPC .... *H02M 3/33523* (2013.01); *G05B 23/0283* (2013.01)

(58) Field of Classification Search
CPC ........................ G05B 23/0283; H02M 3/33523
See application file for complete search history.

(56) References Cited

U.S. PATENT DOCUMENTS

| | | | |
|---|---|---|---|
| 7,184,905 B2 * | 2/2007 | Stefan ................ | G01R 19/2513 |
| | | | 702/63 |
| 2003/0058595 A1 | 3/2003 | Murabayashi et al. | |

(Continued)

FOREIGN PATENT DOCUMENTS

| | | | | |
|---|---|---|---|---|
| CN | 107026501 A | * | 8/2017 | ................ H02J 9/02 |
| CN | 110800202 A | * | 2/2020 | ........... B23K 9/1075 |

(Continued)

OTHER PUBLICATIONS

Machine translation of CN107026501 by Clarivate Analytics, Aug. 2025, 6 pages.*

(Continued)

*Primary Examiner* — Harry R Behm
(74) *Attorney, Agent, or Firm* — LEYDIG, VOIT & MAYER, LTD.

(57)　　　　　　　　ABSTRACT

A power supply system for galvanically isolating an input voltage, which is present on an input side of the power supply system and which is hazardous when touched, from a touchable output voltage, which is to be provided on an output side of the power supply system, and to provide a constant output voltage on the output side, the power supply system including: at least two individual components, at least one individual component of the at least two individual components providing electrical energy, and a predetermined plurality of operating parameters for each individual component of the at least two individual components being monitorable by a sensor unit or a plurality of sensor units; and a monitoring unit in which: at least one operating parameter of the plurality of operating parameters of each (Continued)

individual component is comparable to a stored corresponding reference operating parameter.

11 Claims, 4 Drawing Sheets

(56)                References Cited

U.S. PATENT DOCUMENTS

| | | | | |
|---|---|---|---|---|
| 2010/0161259 A1 * | 6/2010 | Kim | .................. | G05B 23/0283 |
| | | | | 324/120 |
| 2017/0262007 A1 * | 9/2017 | Zhiwu | ...................... | G05F 1/66 |

FOREIGN PATENT DOCUMENTS

| | | | | | |
|---|---|---|---|---|---|
| DE | 102005046658 A1 | | 4/2006 | | |
| DE | 102010004644 A1 * | 7/2011 | ............ | H02J 3/0073 |
| DE | 102018130957 A1 * | 6/2020 | ........ | H02M 3/33523 |
| EP | 0854410 B1 | | 7/1998 | | |
| EP | 1248357 B1 | | 10/2002 | | |

OTHER PUBLICATIONS

Machine translation of CN110800202 by Clarivate Analytics, Aug. 2025, 29 pages.*
Machine translation of DE 102018130957 by Clarivate Analytics, Aug. 2025, 10 pages.*
Machine translation of DE102010004644 by Clarivate Analytics, Aug. 2025, 8 pages.*

* cited by examiner

POWER SUPPLY SYSTEM WITH OPTIMIZED AVAILABILITY

CROSS-REFERENCE TO PRIOR APPLICATIONS

This application is a U.S. National Phase application under 35 U.S.C. § 371 of International Application No. PCT/EP2022/050811, filed on Jan. 14, 2022, and claims benefit to Luxembourg Patent Application No. LU 102478, filed on Jan. 26, 2021. The International Application was published in German on Aug. 4, 2022 as WO/2022/161794 under PCT Article 21(2).

FIELD

The present invention relates to a power supply system, which is configured to galvanically isolate an input voltage, which is present on the input side and which is hazardous when touched, from a touchable output voltage, which is to be provided on the output side, and to provide a constant output voltage on the output side. The power supply system comprises at least two individual components, wherein at least one of the individual components is configured to provide electrical energy and wherein a predetermined plurality of operating parameters for each individual component can be monitored by means of a sensor unit or by means of several sensor units. The power supply system further comprises a monitoring unit.

BACKGROUND

An energy supply system is known from EP 0 854 410 B1, which has a plurality of energy supply devices, wherein several of these energy supply devices are configured to be redundant and wherein abnormality detection means are provided and wherein in the event of a detected abnormality a first signal can be generated, which indicates which of the redundant energy supply devices is in an abnormal state, and a second signal can be generated, which indicates that the energy supply device is mounted at a corresponding installation point.

A method for monitoring a power delivery system is described in EP 1 248 357 B1, in which parameters of the power delivery system are detected via a sensor and are supplied to a regulator as input signal, wherein the parameter data is collected in order to predict a pending maintenance or an upcoming operating failure as a function of the collected historical data.

SUMMARY

In an embodiment, the present invention provides a power supply system for galvanically isolating an input voltage, which is present on an input side of the power supply system and which is hazardous when touched, from a touchable output voltage, which is to be provided on an output side of the power supply system, and to provide a constant output voltage on the output side, the power supply system comprising: at least two individual components, at least one individual component of the at least two individual components being configured to provide electrical energy, and a predetermined plurality of operating parameters for each individual component of the at least two individual components being monitorable by a sensor unit or a plurality of sensor units; and a monitoring unit configured in such that: at least one operating parameter of the plurality of operating parameters of each individual component is comparable to a stored corresponding reference operating parameter, reference values of the stored reference operating parameter being stored for respective different operating states, at least one operating parameter of one individual component of the at least two individual components is comparable to a corresponding operating parameter of an other individual component of the at least two individual components, and based upon a detected deviation between a value of the operating parameter and a value of the reference operating parameter beyond a predetermined measure, or based upon a detected deviation between a value of the operating parameter and a value of the corresponding operating parameter beyond a predetermined measure, at least one of the individual components is controllable such that availability of each individual component is optimized and/or the detected deviation is displayed or outputtable as a signal, respectively.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figures 1, 2:
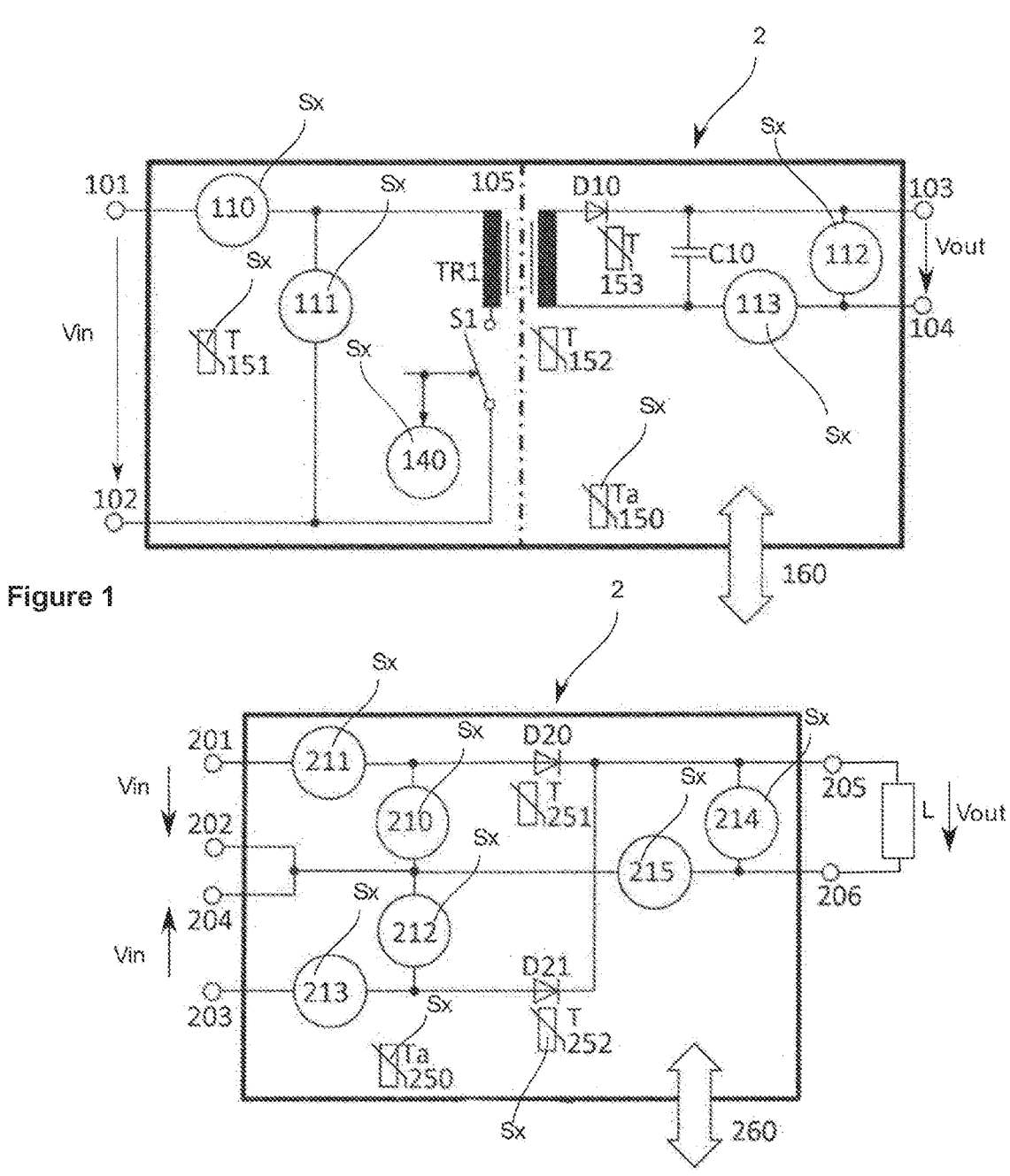
FIG. 1 shows, in a first exemplary embodiment, an individual component configured as switching power supply unit or DC/DC converter.
FIG. 2 shows, in a second exemplary embodiment, an individual component with the construction as redundancy module as diode module or as so-called OR ring module.

In an embodiment, the present invention provides a power supply system, which is further optimized with regard to the availability of the plant, in which the power supply system is used. The detection of critical operating states within the power supply system itself is furthermore improved.

In an embodiment, the present invention provides a power supply system as described herein. A power supply system according to the invention is configured to galvanically isolate an input voltage, which is present on the input side and which is hazardous when touched, from a touchable output voltage, which is to be provided on the output side, and to provide a constant output voltage on the output side. The power supply system comprises at least two individual components, wherein at least one of the individual components is configured to provide electrical energy and wherein a predetermined plurality of operating parameters for each individual component can be monitored by means of a sensor unit or by means of several sensor units, and further comprises a monitoring unit. The monitoring unit is thereby configured according to the invention in such a way that at least one operating parameter of the plurality of operating parameters of each of the at least two individual components is comparable to a stored corresponding reference operating parameter, wherein reference values of the stored reference operating parameter are stored for respective different operating states. The monitoring unit is furthermore configured in such a way that at least one of the operating parameters of the one individual component is comparable to a corresponding operating parameter of the other individual component. The monitoring unit is further configured in such a way that in the event of a detected deviation between the value of the operating parameter and the value of the reference operating parameter beyond a predetermined measure or in the event of a detected deviation between the value of the operating parameter and the value of the corresponding operating parameter of the other individual component beyond a predetermined measure, at least one of the at least two individual components can be controlled in such a way that the availability of each individual component is optimized and/or that the detected deviation is displayed or can be output in the form of a signal, respectively. A power supply system is created thereby, which is further improved with regard to the availability of the power supply system as well as with regard to the availability of the plant, in which the power supply system is used. Plant availabilities can be optimized and downtimes can be minimized.

According to an advantageous implementation of the invention, it can be provided that the monitoring unit is configured in such a way that the data of the plurality of predetermined operating parameters for each of the at least two individual components is detected for a predetermined period of time and is stored in a temporally synchronized manner. This operating data can be, e.g., external data, such as the input or output voltage, the input or output current, or the ambient temperature of the individual component. Internal data, such as component temperatures, supply voltages, supply currents, clock frequencies, or the clock ratio is likewise determined. In particular in the case of voltages or currents, the peak value as well as the effective value or a falling below or exceeding of a threshold value can likewise be determined. The advantage of this implementation lies in that problems in the power supply and/or in the plant, which is supplied via the power supply, can already be detected at an early stage by means of a data history constructed in this way, and that this can be counteracted systematically.

According to a further preferred further development of the invention, it can also be provided that each of the individual components is selected from a selection of the following individual components:

power supply unit,
uninterrupted power supply device,
redundancy module,
DC/DC converter,
energy storage module,
protection module.

According to a likewise advantageous implementation of the invention, it can furthermore be provided that the monitoring unit is configured in such a way that a faulty use of the at least one individual component can be detected by means of the evaluation, so that damage to the plant occurring as a result or a failure thereof can be detected and prevented.

According to a further particularly preferred embodiment of the invention, it can be provided that the operating parameters to be monitored are selected from a selection of the following parameter variables:

input voltage of the individual component(s),
output voltage of the individual component(s),
input current of the individual component(s),
output current of the individual component(s),
ambient temperature of the individual component(s),
component temperature of an internal component of the individual component(s),
supply voltage of an internal component of the individual component(s), supply current of an internal component of the individual component(s),
clock frequency of an internal component of the individual component(s),
clock ratio of an internal component of the individual component(s),
service life of an internal component of the individual component(s) or service life of the individual component(s) themselves, and/or
operating time of the individual component(s).

The mentioned operating parameters can be monitored with regard to the falling below and/or exceeding of specified reference values. In particular in the case of voltages or currents, the peak value as well as the effective value or a falling below or exceeding of a threshold value can be determined. In particular the effect that the loading of the individual components or of the components of an individual component can be attained therewith. For example, errors in the power supply system or at or in the respective individual component can be detected at an early stage therewith. In particular an estimation of the expected service life of the system or of the individual component or of a component in the individual component can also be calculated.

When monitoring the individual components or when monitoring the components thereof with regard to temperature, simple mechanisms, such as, e.g., the exceeding of a certain limit temperature, also take effect initially. These mechanisms can then be linked to the ambient temperature and the heat-up of the component can be calculated subsequently. In the case of a certain energy expenditure, deviations can be identified by means of previously determined comparative data. For example, the component temperature can increase by changing the contact resistance at soldered joints or by means of a deterioration of the convection. Depending on the viewed component, very different changes can be identified. For example, an increased voltage ripple results due to the aging of capacitors, so that conclusions to the service life of the power supply are possible. If a temperature increase was detected, the latter is preferably linked to the load current. The changed operating data can then either be attributed to additional consumers and thus to a larger power loss in the switch cabinet or can be associated with a failure of the switch cabinet climate control. Further physical variables, such as the air pressure or humidity are measured in an advantageous manner and the installation height of the power supply is determined thereby. It can then be reported to the user, which maximum output power is to be expected in the installation height due to the derating, and reporting thresholds can additionally be adapted automatically. In a further development of the invention, the data, such as input voltage, input current, and mains frequency is detected, broken down by fundamental frequencies and harmonics, and is used to analyze the mains. The power supply can then use the detected interferences, such as harmonics and reactive powers, either on its own to stabilize the mains or to actively control mains filters. Reactive power can be compensated in both cases and harmonics can be reduced. Due to the observation of the data over the complete product life cycle, purchase suggestions can be given when newly acquiring the components. If the power supply was temporarily operated at the upper limit of the device, a more powerful power supply is suggested, for example, in order to have sufficient reserve even for a plant expansion. If, in contrast, the power supply is operated only in the lower power range, the next smaller power level can be suggested. Not only utilized capacitance itself, but also the ambient temperature and the installation height is considered thereby, so that the selected power supply is designed optimally for the ambient conditions.

The invention can furthermore also be further developed to the effect that the power supply system is configured to be redundant and comprises at least a first individual component for the power supply and a second individual component for the power supply, wherein each individual component is configured to be able to maintain the power supply on its own, and wherein the first individual component and the second individual component are coupled to one another in such a way that the power supply takes place proportionately by means of both individual components, wherein the proportion of the respective individual component in the power supply takes place as a function of the respective predetermined operating parameters. The advantage of this implementation is that all components are loaded in a balancing manner and an operating time of the system, which is optimized as a whole, can be attained thereby. Due to the distribution of the current between the individual components and the mainly square dependence of the losses on the flown-through current and the thus square increase of the heat-up with the linear increase of the current, the service life of the power supply system or of the individual components can be increased by means of a distribution of the current load between parallel components.

In a likewise preferred implementation variation of the invention, it can also be provided that the monitoring unit is configured in such a way that the operating parameters to be monitored are detected cyclically. It can be attained thereby that changes during identical loading can be identified when cyclically detecting the operating parameters, and an early warning prior to a failure of the power supply system is thus possible. Alternatively or additionally, it can be provided that the monitoring unit is configured in such a way that the operating parameters to be monitored are detected at a predetermined point in time during operation, in particular that the operating parameters are detected when turning on and/or when turning off semiconductor switches within an individual component and/or when turning on and/or turning off a consumer connected to the power supply system. The advantage, which can be realized thereby, is that the individual components can be monitored in critical points and that the amount of the data to be determined remains small and clearly arranged at the same time.

In an embodiment, the present invention provides a method for detecting anomalies in a power supply system according to the invention, wherein the plurality of the operating parameters of the at least two individual components are compared by means of a monitoring unit to operating parameter reference values, which are assigned to the different operating states, and that the plurality of the operating parameters of the at least two individual components can be compared to one another by means of the monitoring unit. In the event of a detected deviation beyond a predetermined measure in the case of at least one of the comparison, at least one of the at least two individual components can thus be controlled in such a way that the availability of each individual component is optimized and/or that the detected deviation is displayed or is output in the form of a signal, respectively.

In an embodiment of the method all operating data of the predetermined operating parameters of the individual components of the power supply system is collected and stored, wherein at least one individual component accesses the centrally stored data at least for the purpose of an analysis as to whether a proper operation of the individual component is present. As a function of the result of the performed analysis, the individual component can then be controlled in such a way that the availability of the power supply system is optimized and/or that detected deviations of operating parameter values of the individual component are displayed or are output in the form of a signal, respectively.

In an embodiment, the present invention provides a method for detecting anomalies in a network of a plurality of power supply systems, wherein the power supply systems are connected in a common network by means of data technology. For this purpose, all operating data of the predetermined operating parameters of the individual components of the power supply systems is in particular collected in an anonymized manner and is stored centrally, wherein all power supply systems access the centrally stored data at least for the purpose of an analysis as to whether a proper operation of each individual component is present. As a function of the result of the performed analysis, the individual components can then be controlled in such a way that the availability of each power supply system is optimized and/or that detected deviations of individual components of the power supply systems are displayed or are output in the form of a signal, respectively. The power supply systems are thereby in particular configured according to the invention. In a network of this type of power supply systems, the data at the respective consumers is detected in the same way as at the individual power supply. In addition to the input and output variables, internal data, such as, for example, the component temperatures, auxiliary voltages and currents is also measured at a power supply system, which is configured as redundancy module. The state or the capacitance, respectively, of the storage is additionally measured at an energy storage and the current flowing through is detected at a protection module. Due to the adjustment of the input and output data of the individual components, errors in the power supply system can be detected and operating states can be optimized. In a redundant system, only one power supply unit often feeds the majority of the load due to unbalances, while the other power supply unit works virtually while idling. In the case of the system constructed according to the invention, it is provided to perform an adjustment of output voltage and current between the components—even in response to a change of the parameters, such as the ambient temperature or the input voltage or the total output current—and to thus successively adapt the output voltage until both power supplies feed the load equally. If it is detected, in contrast, that a power supply unit in the system has a lower remaining service life expectation, this information can likewise be included in the algorithm, so that the power supply unit with the shorter service life is loaded less. This is equally possible when the redundantly operated power supplies are operated in different switch cabinets and at different ambient temperatures. The power supply unit, which operates at a higher ambient temperature, can likewise be protected by reducing the power in this case. In addition, redundancy modules are typically mounted in close proximity to the load, so that an increased voltage drop can often be determined between power supply and redundancy module due to long line lengths. In this case, the output voltage in the system can also be increased gradually, so that it is ensured that the required 24 V still arrive at the consumer. If, in contrast, no input voltage at all is still detected at a consumer, a conclusion can be drawn directly to a cable break and an error message can be generated. In an uninterrupted power supply system, the battery management plays in essential role. Due to a communication between power supply, uninterrupted power supply (UPS) and energy storage, the discharged battery can be charged with the maximally possible load current when the power is not simultaneously required at the consumer. Due to the learning of the standard operating procedure, the system detects at which times of the day plant parts are turned off and less power is required, so that the recharging of the battery can be planned optimally. The advantage resulting therefrom is in particular that the loading of the power supply system can be decreased and that an increased service life of the individual components and/or of the power supply system results.

Known error scenarios can be detected, reported, and resolved by means of the above-described measures, and the operating state of the single device can be adapted in order to meet the primary objective of the maximum plant availability of the complete system. It is a further objective to detect error scenarios, which are not expected immediately by detecting anomalies in the system, and to intervene in the system by means of self-learning algorithms. For this purpose, the stored operating data is analyzed with regard to routinely recurring events, in order to then determine the standard operating procedure of the power supply system. In response to an unexpected deviation from the standard operating procedure, an automatic assignment is made as to whether this is a permitted operating state (e.g. exchange of a device from the power supply system) or whether the deviation can be attributed to a faulty operating state. As a result, the power supply system can generate a message and can additionally intervene in the system by means of self-learning algorithms. Strong deviations within a short period of time as well as gradual deviations over a longer period of time are detected and reported. The operating data of the power supply component is recorded for each detected deviation. The user can additionally give instructions from the outside when, for example, a machine is configured anew or when an already learned and stored operating state is reestablished. An exemplary application is the use of a previously used tool, of which the standard operating procedure of the power supply system has already been analyzed. After a device exchange, already learned operating procedures and algorithms can furthermore be transferred from the previous device into the new device. A mathematical approach is to transfer the sampled signals (voltage, current, temperature, etc.) into the frequency range by means of low-frequency Fourier transformation. Due to the breakdown of the data in the frequency range, regularities as well as deviations can be detected more easily.

In a further expansion stage, not only the anomalies within a power supply system, but also the anomalies compared to other power supply systems can therefore be detected. For this purpose, the power supply system is modified so that all operating data (such as output voltage, output current, temperature data, service life, etc.) for the power supply system, which is connected to the network, is collected in an anonymized manner in the backend. In the first step, the data recorded on a central data storage is used by a plurality of power supplies for further analysis. Reference models, which describe the normal state of a power supply system, are learned from these actually recorded swarm data. By means of the creation of data profiles, power supply systems with similar operating procedures can be assigned to one another. It is then the objective to compare the individual power supply system over the complete product life cycle to the standard profile generated from the data volume. The deviation from the reference model is detected and subsequently assigned in groups by means of self-learning algorithms, so that, e.g., anomalies, which appear after a similar operating time, are put into context. An evaluation of the anomaly takes place additionally, in that it is analyzed, how strongly and in how many signals the system behaves differently from the reference model. If a detected anomaly is classified so that an error in the power supply system is to be assumed, the backend reports this back to the frontend. The user is warned in time if the anomaly could lead, e.g., to a premature failure of the system. By means of additional information, which is provided via the backend, it is possible to adapt plant parts dynamically to ambient conditions, such as variable electricity tariffs and to thus manufacture them at the most cost-efficient times possible. The implementation of the anomaly detection could be based on different methods of machine learning, which are already known from other fields (such as, e.g., neuronal networks).

For example, four possible individual components 2 and the communication thereof are shown via an interface in an energy or power supply system 1, respectively:

switching power supply unit or DC/DC converter
redundancy module
protection or switching module
uninterrupted power supply or UPS.

The exact construction can differ from the construction described in an exemplary manner—e.g. at which points an input or output voltage is measured.

The different implementations of the individual components 2 as well as exemplary structures for power supply systems 1 will be explained in the following descriptions relating to the drawing figures.

FIG. 1 shows, in a first exemplary embodiment, a power supply 100 in the form of an individual component 2 configured as switching power supply unit in schematic illustration. The illustrated power supply 100 consists essentially of the input voltage connections 101 and 102 as well as the output voltage connections 103 and 104. The power supply is supplied, for example, from a non-illustrated, upstream AC voltage source, the output voltage of which is rectified and smoothed accordingly. The input voltage is subsequently clocked by means of an electronic switch 51 and is put onto a transformer TR1. The transformer TR1 galvanically isolates the input and output voltage above the isolating distance 105. The output voltage of the transformer TR1 is subsequently rectified, e.g., by means of a diode D10 and is smoothed by means of a capacitor C10. For this purpose, a large variety of circuits for power supplies are known from the literature, ranging from the simple 50 Hz transformer power supply unit to various circuits for switching power supply units, e.g. flux or reverse converters, which adapt and regulate the energy via a transformer or also via a capacitance in a galvanically isolated manner from the input voltage to a desired output voltage. Various variables can be measured in the power supply 100, e.g. the input current 110 via a first sensor Sx, the input voltage 111, the output voltage 112, and the output current 113 via a further sensor Sx. Various further variables 140, such as the clock ratio or the clock frequency or the on or off time can likewise be measured at the used components, such as the electronic switch 51, by means of further sensors Sx. In the power supply, the temperatures at different subassemblies 151-153 as well as the ambient temperature 150 can likewise be measured. These measured variables can be communicated to the outside via an interface 160. The power supply, e.g., the output voltage, can likewise be set via the interface 160.

FIG. 2 shows, in a second exemplary embodiment, an individual component 2 with the construction of a redundancy module as diode module or as so-called OR-ing module. The individual component 2 configured as diode module 200 supplies a load L at the output voltage connections 205 or 206, respectively, with two input voltages via the terminal terminals 201 and 202 or 203 and 204, respectively. The two input voltages are connected via the two diodes 20 and 21. If the output current is smaller than the maximum current of the sources in each case, the load L can be supplied redundantly. In the event of a failure of a source, the load is in each case supplied by the other source. In the case of an output-side short circuit within the feeding source or wiring, the diodes D20, D21 in each case also block. According to the demands on the reliability of the power supply system, further diode branches and input voltage sources can be connected in parallel. In a further implementation, the diodes D20, D21 can be replaced with (non-illustrated) switched field effect transistors (FET) as so-called OR-ing module in order to significantly decrease the losses within the module. An additional voltage drop can also be adjusted via the FETs in order to symmetrize the input currents. The diode module can also be realized by means of an output-side parallel connection of several individual diodes or semiconductor switches. Measured variables, such as the input voltages 210 or 212 or the input currents 211 or 213 as well as the output voltage 214 or the output current 215 can be detected in the diode module via different sensors Sx. Temperatures can likewise be measured at the diodes via the sensors Sx configured as temperature sensors 251 and 252 as well as the ambient temperature via a sensor Sx configured as ambient temperature sensor 250 and can be communicated to the outside via an interface 260. If the diodes D20, D21 are replaced with two semiconductors, which are connected inversely in series, e.g. FETs, these FETs can also be used as switching module or protection module, which will be introduced below.

Figures 3, 4:
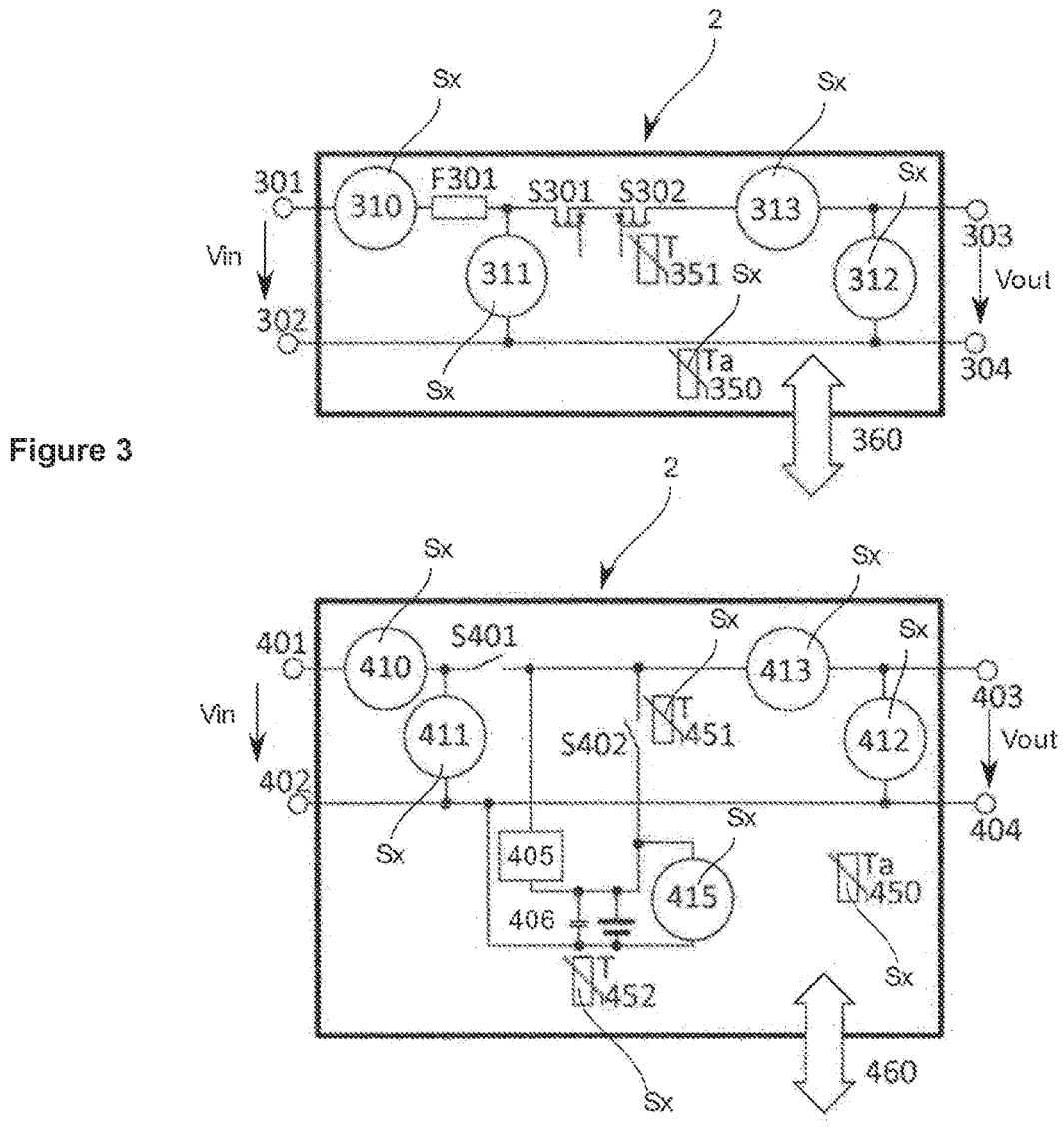
FIG. 3 shows, in a third exemplary embodiment, an individual component configured as protection or switching module.
FIG. 4 shows, in a fourth exemplary embodiment, an individual component configured as uninterrupted power supply (UPS)

FIG. 3 shows, in a third exemplary embodiment for an individual component 2, an individual component 2 configured as protection or switching module. The shown individual component 2 comprises a first current path, between an input terminal 301 and an output terminal 303, in which a fuse F301 as well as two actively switchable semiconductor switches 5301, 5302, which are connected in series thereto. A second current path is provided parallel thereto, which forms a simple line connection between a second input terminal 302 and a second output terminal 304. The fuse F301 triggers at a certain current and interrupts or separates the not-illustrated input source, which is connected to the terminals 301 and 302, from the output-side load at the terminals 303 and 304. In the simplest case, the protection module can also be used as dipole and can be connected only into a power supply path, as it is realized, e.g., by means of circuit breakers or simple fuses. The protection module may comprise two circuit breakers, which are optionally coupled anti-serially. In a further form, the protection module can also be constructed as distributor comprising several input-side fuses in order to connect several sources and/or several output-side fuses, in order to individually secure several loads. The protection module can also be realized with semiconductors, by means of which the loads are isolated from the sources starting at a certain current. The current level as well as the duration of the current for turning off can be specified thereby. The protection module or switching module can be realized from any semiconductor switches, such as MOSFETs or also electromechanical switches, such as relays. When using two semiconductor switches, which are connected inversely in series, here MOSFET 5301 and 5302, a feedback from the output to the input can additionally be prevented, e.g. when an inductive load is turned off. The semiconductor switches 5301 and 5302 can be used in order to turn off the output paths, e.g., in order to save energy. Further triggering mechanisms, such as, for example, a fault-current circuit breaker or an isolation or earth faut monitor, are not illustrated. Measured variables, such as the input voltage 311 or the input current 310 as well as the output voltage 312 or the output current 313 can be detected in the protection or switching module, respectively, via different sensors Sx. Temperatures 351 at the switches or fuses or the ambient temperature 350 can likewise be measured and can be communicated to the outside via an interface 360. The triggering characteristics for a protection module can also be adjusted via the interface 360 and the switches can be turned on or off, respectively, when used as switching module.

FIG. 4 shows, in a fourth exemplary embodiment, an individual component 2 configured as uninterrupted power supply (UPS). To ensure an energy supply in the event of failure of the feeding source, a UPS is used in an energy supply system. Said UPS monitors the input voltage and supplies the required energy from an energy storage in the event of failure. The shown UPS is implemented as so-called direct current UPS (DC UPS), which in the event of failure of the input voltage isolates the input source at the terminals 401 and 402 by means of the switch 5401, e.g. in the case of input-side short circuit, and connects the energy storage 406, e.g., in the form of capacitors and/or batteries via the switch 5402 and supplies the load at the output terminals 403 and 404 (with an output voltage Vout). During normal operation, the energy storage 406 is charged via a charger 405. The shown implementation only represents one possible realization of a UPS. However, the latter can also be realized by means of a capacitor or a battery, which are simply connected in parallel to source and load. Further examples are an alternating current UPS (AC UPS), which can completely supply the switch cabinet with an alternating current, or motor-driven generators, which can optionally also supply larger loads. Measured variables, such as the input voltage 411 (Vin) or the input current 410 as well as the output voltage 412 or the output current 413 can be detected in a UPS by means of different sensors Sx. The voltage 415 or the temperature 452 at the energy storage can likewise be measured by means of further sensors Sx. Further measured variables, such as charging or discharging current, respectively, capacitance or state of charge, respectively, or aging of the energy storage, are not illustrated. Temperatures 451 at the switches can likewise be measured via sensors Sx or the ambient temperature 450 by means of the sensor Sx, and all measuring data can be communicated to the outside via an interface 460. A failure of the energy supply can likewise be signaled to consumers, such as a controller, e.g. in order to turn off loads or to secure data. The UPS can also be controlled via the interface 460, e.g., to prevent connecting or engaging of the UPS when turning off the plant.

Figures 5, 6:
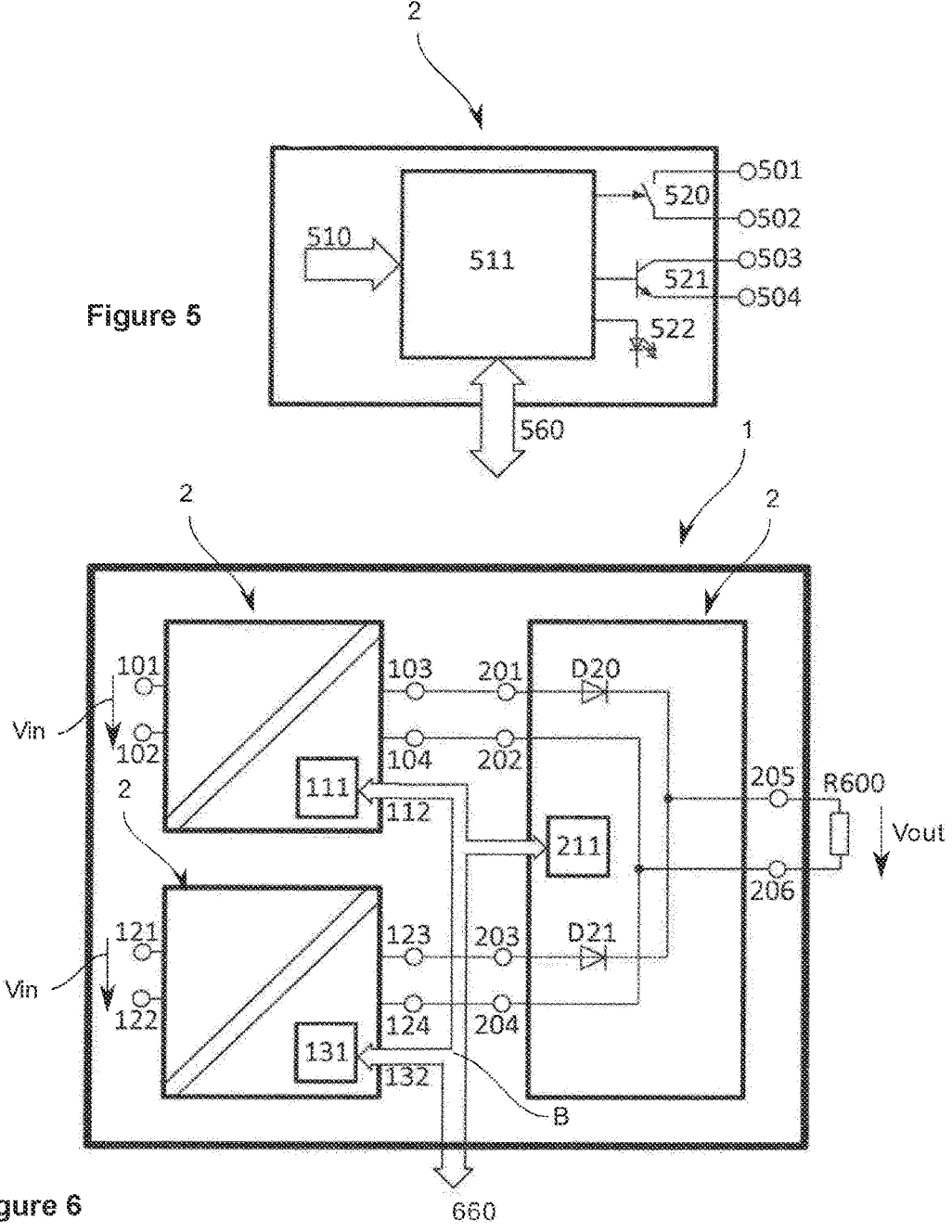
FIG. 5 shows, in a fifth exemplary embodiment, in schematic illustration, an individual component configured as power supply component comprising analysis and signal outputs.
FIG. 6 shows a power supply system comprising a plurality of individual components.

FIG. 5 shows, in a fifth exemplary embodiment for an individual component 2, an individual component 2 configured as power supply component comprising analysis and signal outputs in a schematic illustration. In the shown exemplary embodiment, the measuring data 510 of an energy supply component is detected, processed, and evaluated by a circuit 511, e.g. a microcontroller, and is compared to, e.g., threshold values. The processing of the measuring data can be parameterized via an interface 560, e.g. threshold values can be adjusted. It can likewise be selected, which data is output. It can be specified, e.g., which data is output in which cycles on an interface 560 or which processed data is output on an output, e.g., relay 520 or semiconductor output 521 or optical output, such as an LED 522. The data can likewise be input as well as output as digital switching signal, as analog variable, or via an interface 560.

FIG. 6 shows a power supply system 1 comprising a plurality of individual components 2. In the shown exemplary embodiment, a redundant power supply system 1 is illustrated. The shown power supply system 1 is configured to isolate an input voltage Vin, which is present on the input side and which is hazardous when touched, from a touchable output voltage Vout, which is to be provided on the output side, and to provide a constant output voltage Vout on the output side. Two individual components 2, which are configured as power supplies, and on the output side via a third individual component 2, which is configured as redundancy module, are connected to one another. To provide for an even distribution of the load currents to both power supplies, both power supplies can communicate directly via a data bus B. The output voltages are thereby regulated so that both power supplies supply the same output current. In a further embodiment, the redundancy module connected downstream can detect the currents and can regulate the output voltages of the power supplies so that both power supplies supply the same output current, and the supply voltage, which is optimal for the consumer R600, is provided at the output 205 and 206 of the redundancy module. The individual components 2 of the power supply system 1 can thereby communicate directly with one another or can communicate to the outside via an interface 660. A monitoring unit 3, which is not illustrated here, is connected to the three individual components via the data bus 660, wherein a predetermined plurality of operating parameters Px for each individual component 2 are detected and monitored via the monitoring unit 3 by means of a sensor unit Sx or by means of several sensor units Sx. A higher-level, non-illustrated controller 3 can likewise adjust the connected power supply system 1 via this communication interface 660 of the redundant power supply system 1.

Figure 7:
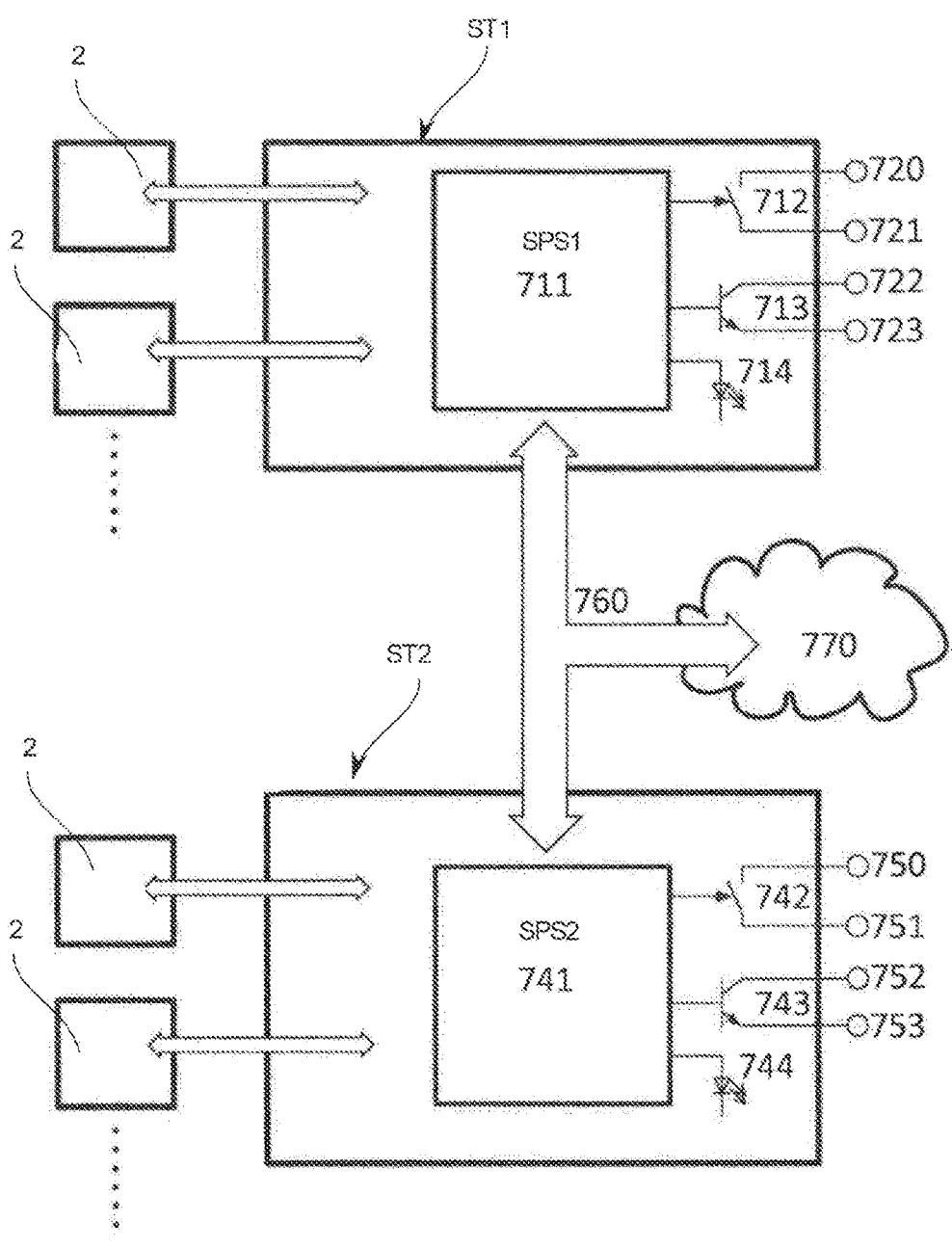
FIG. 7 shows a power supply system constructed in a networked manner with remote communication.

FIG. 7 shows a power supply system 1, which is constructed in a networked manner, with remote communication. According to the shown network of power supply systems 1, the individual individual components 2 of a power supply system 1, which are configured individually as power supply components, are in each case connected to a higher-level first controller ST1 and a higher-level second controller ST2. The first higher-level controller ST1 as well as the second controller can in each case communicate with the power supply components, e.g., via a programmable logic controller SPS1 and SPS2 or via a PC 711, 741 and can analyze the data of the components and can output, e.g., warning messages accordingly or generate an optical signal by means of the display 714, 744 or control the plant via the switching outputs 712, 713; 742, 743. The controller ST1; ST2 can furthermore analyze the data and compare it to, e.g., already stored data in order to detect changes, e.g., of the temperature or current consumption therefrom and optionally output suggestions for maintenance. The data adjustment can likewise be performed via a communication bus 760 with further controllers in order to analyze different behavior therefrom. The data can likewise be stored in a cloud 770 in order to create further comparisons to other plants or to analyze, e.g., different behavior of different plants.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Power supply system
2 Individual component
21 Power supply unit
22 Power supply device
23 Redundancy module
24 DC/DC converter
25 Energy storage module
26 Protection or switching module
3 Monitoring unit
Sx Sensor unit
Vout Output voltage
Vin Input voltage
Px Operating parameter
Px_ref Reference operating parameter
B Ddata bus
ST1 Controller
ST2 Controller

The invention claimed is:

1. A power supply system for galvanically isolating an input voltage, which is present on an input side of the power supply system and which is hazardous when touched, from a touchable output voltage, which is to be provided on an output side of the power supply system, and to provide a constant output voltage on the output side, the power supply system comprising:

at least two individual components, at least one individual component of the at least two individual components being configured to provide electrical energy, and a predetermined plurality of operating parameters for each individual component of the at least two individual components being monitorable by a sensor unit or a plurality of sensor units; and a monitoring unit configured such that:

at least one operating parameter of the plurality of operating parameters of each individual component relates to an operating time of the respective individual component, a service life of an internal component of the respective individual component, or a service life of the respective individual component itself and is comparable to a stored corresponding reference operating parameter, reference values of the stored reference operating parameter being stored for respective different operating states, at least one operating parameter of one individual component of the at least two individual components is comparable to a corresponding operating parameter of another individual component of the at least two individual components, and based upon a detected deviation between a value of the operating parameter and a value of the reference operating parameter beyond a predetermined measure, or based upon a detected deviation between a value of the operating parameter and a value of the corresponding operating parameter beyond a predetermined measure, at least one of the individual components is controllable such that availability of each individual component is optimized and/or the detected deviation is displayed or outputtable as a signal, respectively.

2. The power supply system of claim 1, wherein the monitoring unit is configured such that data of the plurality of predetermined operating parameters for each individual component is detected for a predetermined period of time and is stored in a synchronized manner.

3. The power supply system of claim 1, wherein each individual component comprises:

a power supply unit, an uninterrupted power supply device, a redundancy module, a DC/DC converter, an energy storage module, or a protection or switching module.

4. The power supply system of claim 1, wherein the monitoring unit is configured such that a faulty use of the at least one individual component is detectable by the evaluation.

5. The power supply system of claim 1, wherein the plurality of operating parameters comprise:

input voltage(s) of the individual component(s), output voltage(s) of the individual component(s), input current(s) of the individual component(s), output current(s) of the individual component(s), ambient temperature(s) of the individual component(s), component temperature(s) of an internal component of the individual component(s), supply voltage(s) of an internal component of the individual component(s), supply current(s) of an internal component of the individual component(s), clock frequency (ies) of an internal component of the individual component(s), or clock ratio(s) of an internal component of the individual component(s).

6. The power supply system of claim 1, wherein the power supply system is configured to be redundant and comprises at least a first individual component for the power supply and a second individual component for the power supply, wherein each individual component is configured to maintain the power supply on its own, wherein the first individual component and the second individual component are coupled to one another such that the power supply takes place proportionately by both individual components, and wherein a proportion of a respective individual component in the power supply takes place as a function of respective predetermined operating parameters.

7. The power supply system of claim 1, wherein the monitoring unit is configured such that the plurality of operating parameters are detected cyclically.

8. The power supply system of claim 1, wherein the monitoring unit is configured such that the plurality of operating parameters are detected at a predetermined point in time during operation comprising when turning on and/or when turning off semiconductor switches within an individual component and/or when turning on and/or turning off a consumer connected to the power supply system.

9. A method for detecting anomalies in the power supply system of claim 1, comprising;

comparing the plurality of the operating parameters of the at least two individual components to operating parameter reference values, which are assigned to different operating states, by the monitoring unit, the plurality of operating parameters of the at least two individual components being comparable to one another by the monitoring unit; and upon the detected deviation beyond the predetermined measure in at least one comparison, controlling at least one individual component such that availability of each individual component is optimized and/or the detected deviation is displayed or is output as the signal, respectively.

10. The method of claim 9, wherein all operating data of the predetermined plurality of operating parameters of individual components of the at least two individual components of the power supply system are collected and stored as centrally stored data, wherein at least one individual component accesses the centrally stored data for an analysis as to whether a proper operation of the individual component is present as a performed analysis, and wherein, as a function of a result of the performed analysis, the individual component is controllable such that availability of the power supply system is optimized and/or detected deviations of operating parameter values of the individual component are displayed or are output as the signal, respectively.

11. A method for detecting anomalies in a network of a plurality of power supply systems connected in a common network by data technology, comprising:

collecting all operating data of predetermined operating parameters of individual components of the power supply systems in an anonymized manner as collected operating data;

storing the collected operating data centrally as centrally stored data;

accessing the centrally stored data by all power supply systems for an analysis as to whether a proper operation of each individual component is present as a performed analysis; and as a function of a result of the performed analysis, controlling the individual components of the power supply systems such that availability of each power supply system is optimized and/or detected deviations of individual components of the power supply systems are displayed or are output as a signal, respectively, wherein the power supply systems each comprise a power supply system for galvanically isolating an input voltage, which is present on an input side of the power supply system and which is hazardous when touched, from a touchable output voltage, which is to be provided on an output side of the power supply system, and to provide a constant output voltage on the output side, the power supply system comprising:

at least two individual components, at least one individual component of the at least two individual components being configured to provide electrical energy, and a predetermined plurality of operating parameters for each individual component of the at least two individual components being monitorable by a sensor unit or a plurality of sensor units; and a monitoring unit configured such that:

at least one operating parameter of the plurality of operating parameters of each individual component relates to an operating time of the respective individual component, a service life of an internal component of the respective individual component, or a service life of the respective individual component itself and is comparable to a stored corresponding reference operating parameter, reference values of the stored reference operating parameter being stored for respective different operating states, at least one operating parameter of one individual component of the at least two individual components is comparable to a corresponding operating parameter of an other individual component of the at least two individual components, and based upon a detected deviation between a value of the operating parameter and a value of the reference operating parameter beyond a predetermined measure, or based upon a detected deviation between a value of the operating parameter and a value of the corresponding operating parameter beyond a predetermined measure, at least one of the individual components is controllable such that availability of each individual component is optimized and/or the detected deviation is displayed or outputtable as a signal, respectively.

* * * * *